United States Patent
Fukuta et al.

(10) Patent No.: US 6,520,061 B2
(45) Date of Patent: Feb. 18, 2003

(54) CUTTING APPARATUS FOR CERAMIC GREEN BODIES

(75) Inventors: Ken Fukuta, Ama-gun (JP); Yuji Ueda, Nagoya (JP); Satoshi Sugiyama, Nagoya (JP)

(73) Assignee: NGK Insulators, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/432,604

(22) Filed: Nov. 3, 1999

(65) Prior Publication Data

US 2002/0020275 A1 Feb. 21, 2002

(30) Foreign Application Priority Data

Nov. 5, 1998 (JP) .............................. 10-314625

(51) Int. Cl.$^7$ ............................. B26D 1/46; B26D 1/547
(52) U.S. Cl. ....................... 83/651.1; 83/784; 83/307.2; 83/954; 83/794; 125/21; 125/16.02
(58) Field of Search .................. 125/12, 21, 16.02; 83/651.1, 307.1, 307.2, 307.3, 286, 753, 783, 784, 788, 794, 797, 813, 284, 285, 296, 356.2, 785, 647, 786, 756, 647.5, 758, 548, 781, 624, 581.1, 954

(56) References Cited

U.S. PATENT DOCUMENTS

| 4,238,081 | A | * | 12/1980 | Kovic et al. ............. 242/47.01 |
| 4,484,502 | A | * | 11/1984 | Ebner ...................... 83/651.1 |
| 4,494,523 | A | * | 1/1985 | Wells .................... 83/651.1 X |
| 4,528,883 | A | * | 7/1985 | Goranssom et al. .......... 83/870 |
| 4,702,138 | A | | 10/1987 | Hattori et al. |
| 4,702,139 | A | | 10/1987 | Hattori et al. ................ 83/785 |
| 5,865,162 | A | * | 2/1999 | Kambe et al. ........... 125/16.02 |
| 5,890,481 | A | * | 4/1999 | Bigelow .................. 125/16.02 |
| 6,006,737 | A | * | 12/1999 | Hayashi et al. .......... 125/16.02 |

FOREIGN PATENT DOCUMENTS

| JP | 49-83087 | 8/1974 |
| JP | 61237604 | 10/1986 |
| JP | 62157769 | 7/1987 |

* cited by examiner

Primary Examiner—Boyer D. Ashley
(74) Attorney, Agent, or Firm—Parkhurst & Wendel, L.L.P.

(57) ABSTRACT

An apparatus for cutting green ceramic bodies, includes a traveling path for green ceramic bodies, beds for supporting green ceramic bodies at constant intervals in series along the traveling path, an arm on each side of the traveling path, two drive portions for moving respective arms perpendicularly relative to the traveling path, a drive portion for moving both arms in the same direction as the traveling path, a wire for cutting green ceramic bodies, extending between the arms, and wire supporting portions, on respective arms. Each wire supporting portion includes a servo motor with an axis of rotation, a magnet member around the axis of rotation, a bobbin having a conical surface around which wire is wound, and magnetically coupled to the axis of rotation by the magnet member, and a traversing mechanism for varying the position where the wire is wound around the length of the conical surface.

2 Claims, 6 Drawing Sheets

FIG. 6a n cycles

FIG. 6b

(n+1) cycles

CUTTING APPARATUS FOR CERAMIC GREEN BODIES

BACKGROUND OF THE INVENTION

1. Field of the Invention

The present invention relates to a cutting apparatus for ceramic green bodies, which are soft and easily deformable, such as formed bodies of ceramic honeycomb structural bodies.

2. Description of Related Art

Generally, as a cutting apparatus for cutting the ceramic green bodies such as ceramic honeycomb structural bodies, the cutting apparatuses having various constructions have been known. As an example, the applicant disclosed, in JP-B-4-60402 (U.S. Pat. No. 4,702,138), the cutting apparatus for ceramic green honeycomb structural bodies in which generations of deformation and fracture of the ceramic green honeycomb structural bodies can be prevented by using "draw-cut" operation.

Figure 9:
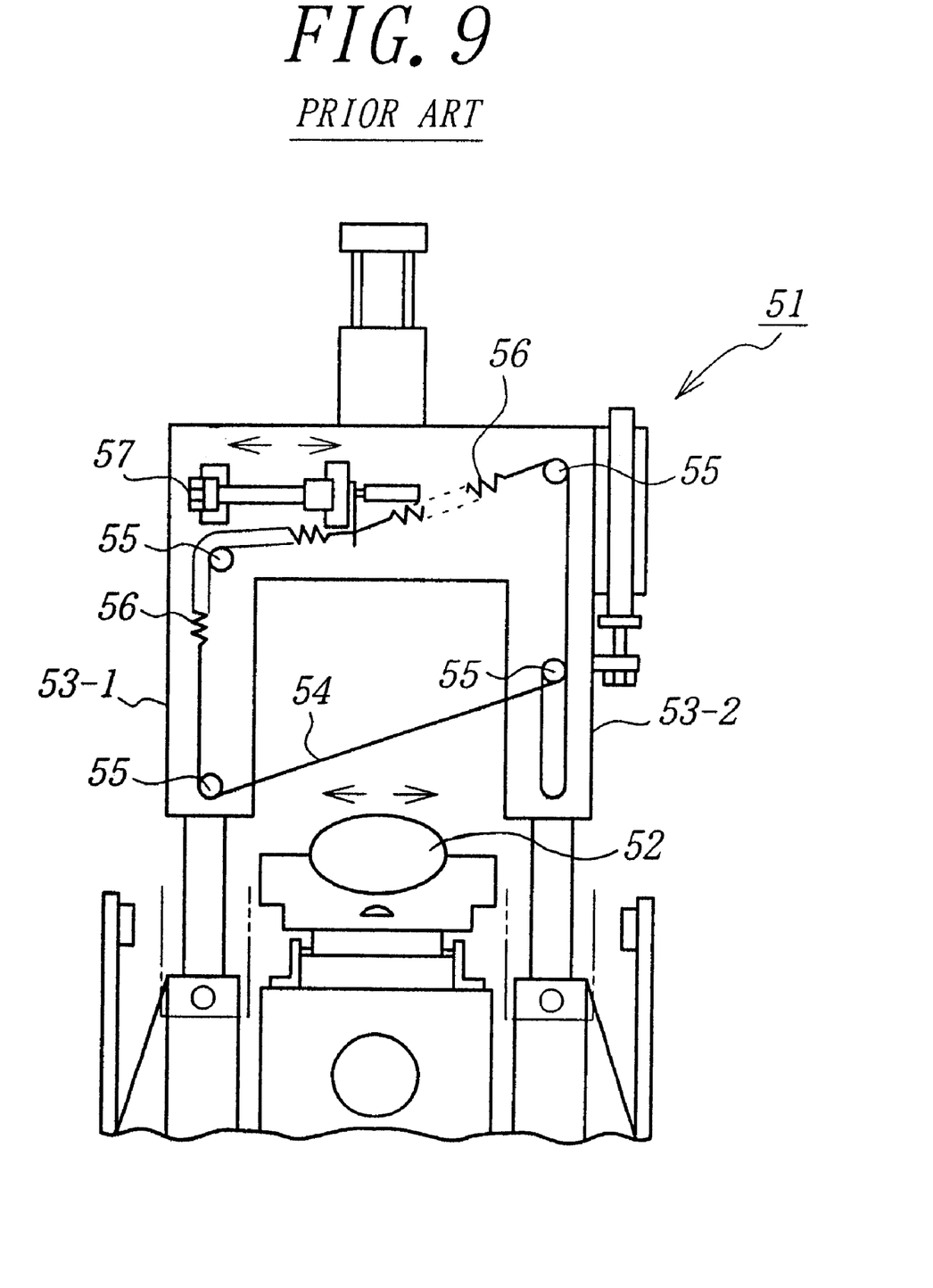
FIG. 9 is a schematic view showing one embodiment of a known cutting apparatus for ceramic green bodies.

FIG. 9 is a schematic view showing the cutting apparatus for ceramic green honeycomb structural bodies mentioned above which have been proposed previously by the applicant. In the embodiment shown in FIG. 9, a cutting apparatus 51 has a following construction. Two arms 53-1 and 53-2 are arranged in a widthwise direction of a ceramic green honeycomb structural body 52. A fine wire 54 used for a cutting operation is extended between the arms 53-1 and 53-2 via rollers 55 arranged to the arms 53-1 and 53-2, and ends of the fine wire 54 extended between the two rollers 55 is cut into the ceramic green honeycomb structural body 52, while the arms 53-1 and 53-2 are moved in a cutting direction of the ceramic green honeycomb structural body 52 by means of an arm moving mechanism (not shown). When the arms 53-1 and 53-2 are moved in the cutting direction of the ceramic green honeycomb structural body 52 and the fine wire 54 for the cutting operation cuts the ceramic green honeycomb structural body 52, at least one operation such that the fine wire 54 is pulled toward one roller 55 side and then pulled toward the other roller 55 side is performed by a fine wire reciprocating mechanism 57.

In the cutting apparatus mentioned above, it is possible to cut rapidly the soft and easily otherwise deformed body such as a ceramic green body without deformation. However, since, in the case of cutting the ceramic green body, a portion of the fine wire 54 used for cutting is always same, there is a drawback such that a life of the fine wire 54 is short and thus it is necessary to exchange the fine wire 54 frequently. Moreover, since there is a portion for connecting the spring 56 and the fine wire 54 and further since it is necessary to extend the fine wire 54 via a plurality of rollers 55, there is a drawback such that an exchanging operation of the fine wire 54 is troublesome.

SUMMARY OF THE INVENTION

An object of the invention is to eliminate the drawbacks mentioned above and to provide a cutting apparatus for ceramic green bodies in which an exchanging interval of a fine wire for cutting can be long so that a life of the fine wire can be long and in which an exchanging operation of the fine wire is easy.

According to the invention, a cutting apparatus for cutting ceramic green bodies comprising; a travelling path for travelling a ceramic green body; supporting beds for supporting the ceramic green body arranged on the travelling path with a constant interval; a pair of first arm and second arm arranged movably in a travelling direction of the ceramic green body, which are provided at both side ends of the travelling path, a first drive portion and a second drive portion for moving the first arm and the second arm respectively upward or downward, which are provided to the first arm and the second arm respectively; a fine wire for cutting the ceramic green body extended between the first arm and the second arm; a first fine wire supporting portion and a second fine wire supporting portion for moving the fine wire for cutting the ceramic green body from one side to the other under constant tension, when the fine wire traverses the ceramic green body by moving the first and second arms in a cutting direction of the ceramic green body. The arms are driven by the first and second drive portions; and a third drive portion for moving the first and second arms in the same direction as the travelling direction of the ceramic green body.

In the present invention, the first fine wire supporting portion and a second fine wire supporting portion function to move the fine wire for cutting the ceramic green body, which extends between the first arm and the second arm, from one side to the other under constant tension. Therefore, when the fine wire traverses the ceramic green body by moving the first and second arms in a cutting direction of the ceramic green body, which are driven by the first and second drive portions, a portion of the fine wire used for cutting differs so that such a portion of the fine wire is used only for a few cutting operations at most, and the fine wire is not broken during the cutting operation. By utilizing preferable following techniques such as (1) the cutting operation is performed by moving the fine wire for cutting the ceramic green body from one side to the other side of the first and second arms, (2), in the case of (1) mentioned above, a moving direction of the fine wire from one side to the other side is reversed every cutting operations, (3) the cutting operation is performed by moving the fine wire reciprocally in both directions, and (4), in the cases of (1)–(3) mentioned above, a travelling speed of the fine wire is changed between travelling from the first arm to the second arm and travelling from the second arm to the first arm. In this manner, it is possible to achieve a long life of the fine wire.

Moreover, in the preferred embodiment, the first and second fine wire supporting portions comprise; a first and second servo motor arranged respectively to the first and second arms; a first and second magnet member arranged around respective rotation axes of the first and second servo motors; and a first and second bobbin for rewinding the fine wire for cutting the ceramic green body. It is easy to construct the cutting apparatus in such a manner that, in the case that the fine wire for cutting the ceramic green body is completely rewound from one bobbin (first bobbin or second bobbin) to the other bobbin (second bobbin or first bobbin), the first bobbin and the second bobbin are exchanged to previously prepared new first bobbin and second bobbin in which the fine wire is extended between them and is completely rewound to one bobbin. In this case, it is possible to perform the fine wire exchanging operation easily.

Further, in the preferred embodiment, a first traversing mechanism and a second traversing mechanism for varying a rewinding position in respective first and second bobbins, in the case that the fine wire for cutting the ceramic green bodies is to be rewound to the first and second bobbins, are provided respectively to the first and second arms. It is possible to prevent a friction increase due to an intertwisting between fine wires when the fine wire is to be rewound around the first bobbin or the second bobbin, and it is also possible to align the fine wires in the first bobbin or the second bobbin. In this case, it is possible to prevent a breakage of the fine wire.

DESCRIPTION OF THE PREFERRED EMBODIMENT

Figure 1:
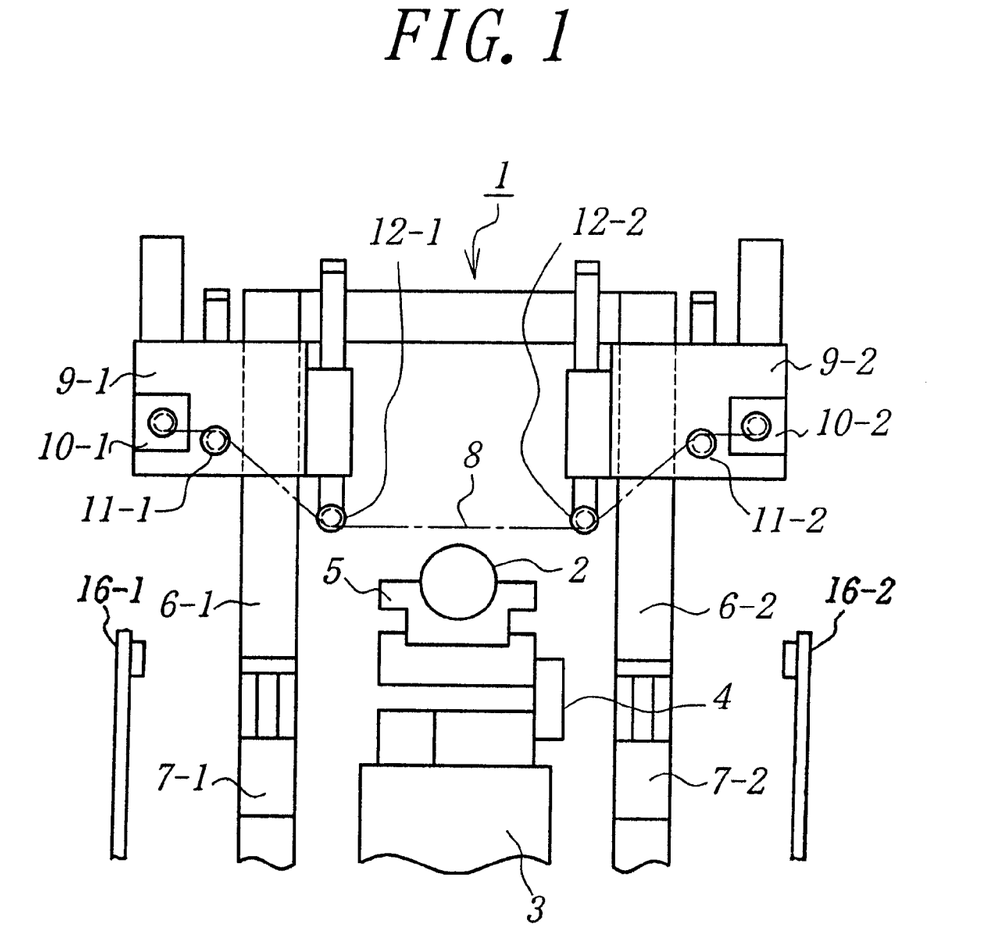
FIG. 1 is a schematic view showing one embodiment of a cutting apparatus for ceramic green bodies according to the invention.

FIG. 1 is a schematic view showing one embodiment of a cutting apparatus for ceramic green bodies according to the invention. In the embodiment shown in FIG. 1, a cutting apparatus for ceramic green bodies 1 according to the invention comprises a travelling path 4 arranged on a base 3 for travelling a ceramic green body 2 in a vertical direction with respect to a sheet plane of the figure and supporting beds 5 for supporting the ceramic green body 2 which are arranged on the travelling path 4 with a constant interval through which a cutting means is passed. Moreover, a pair of first and second arms, 6-1 6-2 arranged movably in a travelling direction of the ceramic green body 2 are provided at both side ends of the travelling path 4. Further, a first drive portion 7-1 and a second drive portion 7-2 constituted by for example a servo motor for moving the first arm 6-1 and the second arm 6-2 respectively upward or downward by means of for example a bolt screw construction are provided to the first arm 6-1 and the second arm 6-2 respectively.

In the embodiment shown in FIG. 1, a fine wire 8 used for cutting the ceramic green body 2 extends between the first arm 6-1 and the second arm 6-2. That is to say, a first plate 9-1 and a second plate 9-2 are provided integrally to the first arm 6-1 and the second arm 6-2 respectively. Then, the fine wire 8 extends between a first fine wire supporting portion 10-1 and a second fine wire supporting portion 10-2 arranged to the first plate 9-1 and the second plate 9-2 respectively. By driving the first drive portion 7-1 and the second drive portion 7-2, the first arm 6-1 and the second arm 6-2 are moved in a cutting direction of the ceramic green body 2 and the fine wire 8 can traverse the ceramic green body 2. In this case, the first fine wire supporting portion 10-2 and the second fine wire supporting portion 10-2 can apply a constant tension to the fine wire 8 and move the fine wire 8 from one side to the other side. Moreover, in the embodiment shown in FIG. 1, numerals 11-1 and 11-2 are a first traversing portion and a second traversing portion mentioned afterward, and numerals 12-1 and 12-2 are a first fixed roller and a second fixed roller for maintaining a part of the fine wire 8 used for cutting in a constant state at every cutting operations.

Figure 2:
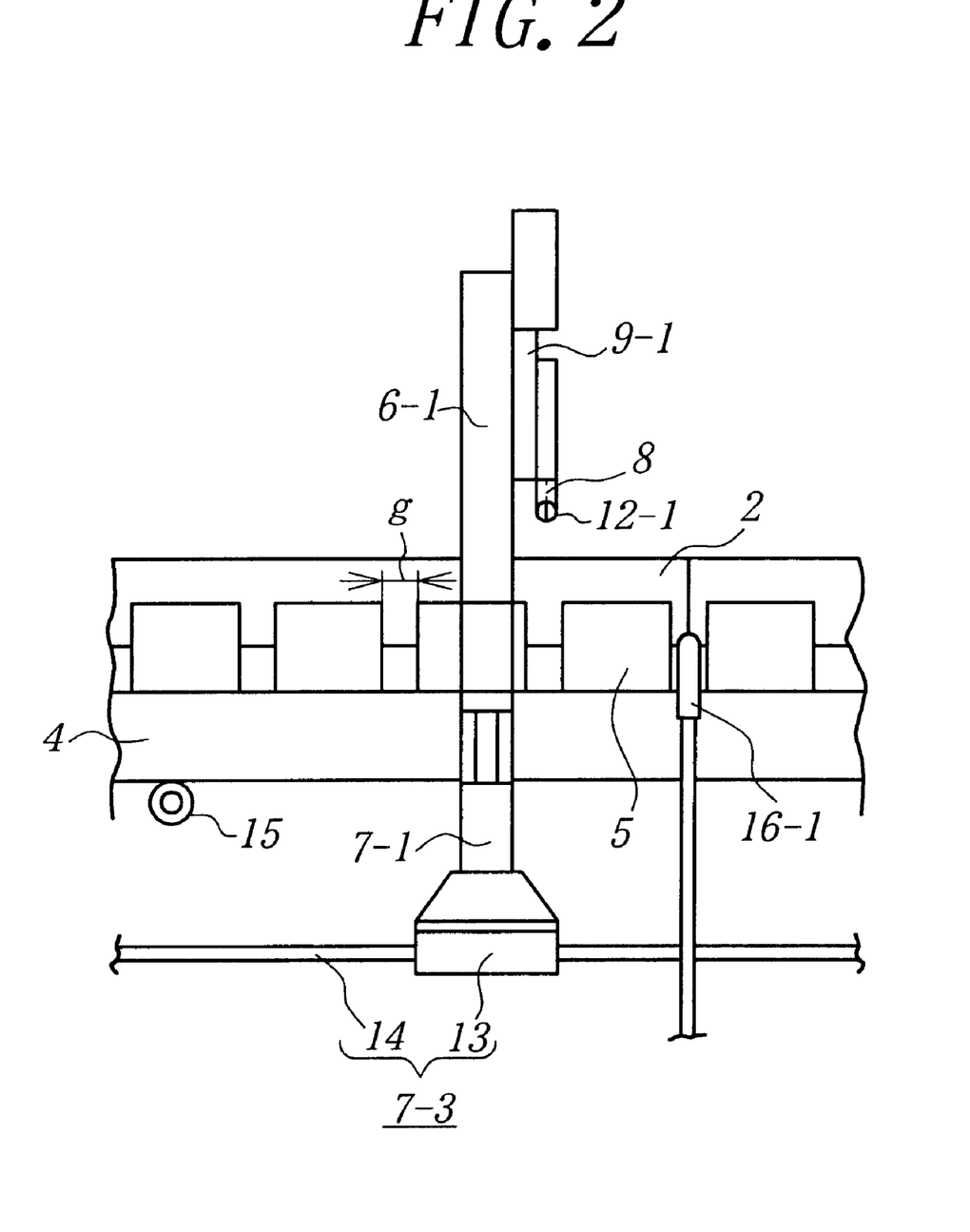
FIG. 2 is a side view illustrating the cutting apparatus shown in FIG. 1.

FIG. 2 is a side view illustrating the cutting apparatus shown in FIG. 1. In the cutting apparatus 1 according to the invention, as shown in FIG. 2, a third drive portion 7-3 comprising, for example, a servo motor 13 and a bolt screw 14 used for moving the first arm 6-1 and the second arm 6-2 in the same direction as the travelling direction of the ceramic green body 2 is provided. Moreover, a rotary encoder 15 is provided to the travelling path 4, and a travelling speed of the travelling path 4 i.e. a travelling speed of the ceramic green body 2 is detected by the rotary encoder 15. Further, a pair of photoelectric switches 16-1 and 16-2 are provided at both side ends of the travelling path 4, and a gap g between the supporting beds 5 is detected by the pair of photoelectric switches 16-1 and 16-2. The photoelectric switches 16-1 and 16-2 are positioned apart from the fine wire 8 by a distance from one gap g to the next gap g as shown in FIG. 2, and thus it is possible to determine that the position at which the photoelectric switches 16-1 and 16-2 detect the gap g is a cutting position of the ceramic green body 2 by means of the fine wire 8.

Figure 3A:
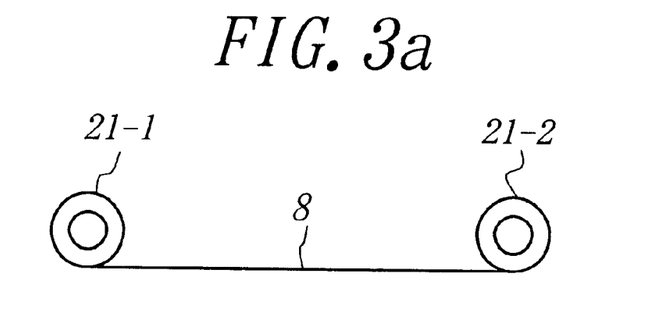
FIGS. 3a and 3b are schematic views respectively explaining a fine wire extending method in the cutting apparatus according to the invention.

FIG. 3 is a schematic view explaining a method of extending the fine wire 8. In the present invention, when the fine wire 8 is to be extended between the first fine wire supporting portion 10-1 and the second fine wire supporting portion 10-2, a fine wire winding body in which the fine wire 8 is rewound around a first bobbin 21-1 and a second bobbin 21-2 is previously prepared as shown in FIG. 3a. Before the fine wire winding body is set in the cutting apparatus 1, one end of the fine wire 8 exists in one bobbin for example the first bobbin 21-1, and substantially all of the fine wire 8 including the other end thereof exists in the other bobbin i.e. the second bobbin 21-2 in this case. Then, a plurality of the fine wire winding bodies in which the fine wire 8 is rewound around the first bobbin 21-1 and the second bobbin 21-2 are prepared, and the thus prepared fine wire winding body is set to the cutting apparatus 1 every exchanging operations of the fine wires 8.

Figure 3B:
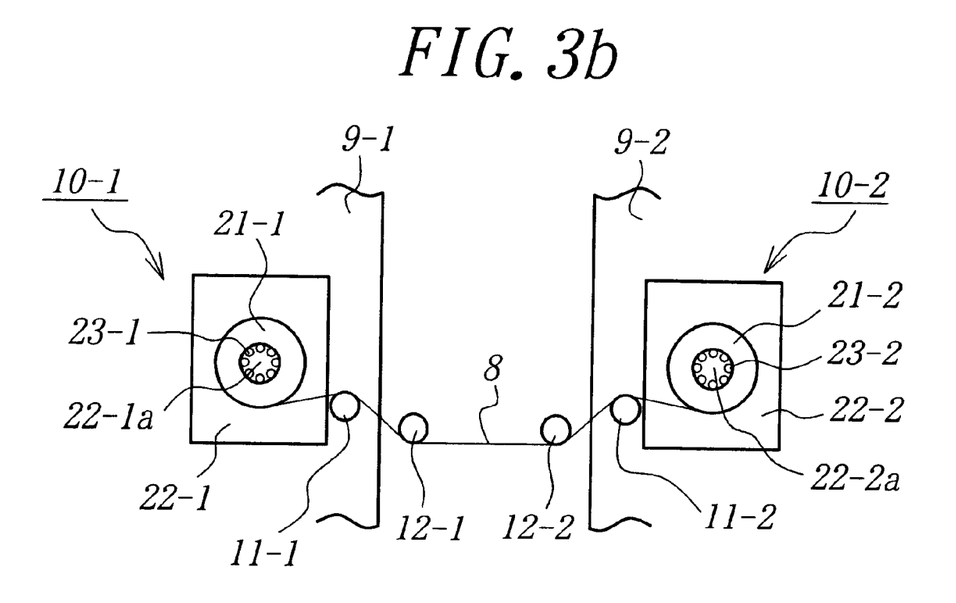

A setting operation of the fine wire winding body shown in FIG. 3a is as follows. That is to say, as shown in FIG. 3b, the first bobbin 21-1 and the second bobbin 21-2 of the fine wire winding body are respectively connected and fixed to rotation axes 22-1a and 22-2a of a first servo motor 22-1 and a second servo motor 22-2 respectively constructing the first fine wire supporting portion 10-1 and the second fine wire supporting portion 10-2. The connecting/fixing operation mentioned above is performed by connecting and fixing the first bobbin 21-1 and the second bobbin 21-2 both made of metal to the rotation axes 22-1a and 22-2a by means of a first magnet 23-1 and a second magnet 23-2 arranged to the rotation axes 22-1a and 22-1a. In this case, the fine wire 8 is extended in such a manner that the fine wire 8 is passed upward of the first and second traversing mechanisms 11-1 and 11-2 and is passed downward of the first and second fixed rollers 12-1 and 12-2.

In the embodiment shown in FIG. 3, the first fine wire supporting portion 10-1 is constructed by the first bobbin 21-1, the first servo motor 22-1 and the first magnet 23-1 and the second fine wire supporting portion 10-2 is constructed by the second bobbin 21-2, the second servo motor 22-2 and the second magnet 23-2.

Figure 4A:
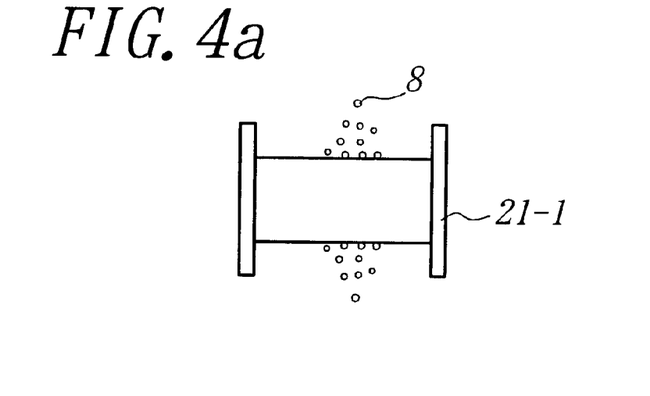
FIGS. 4a and 4b are schematic views respectively explaining a movement of a traversing mechanism in the cutting apparatus according to the invention.
Figure 4B:
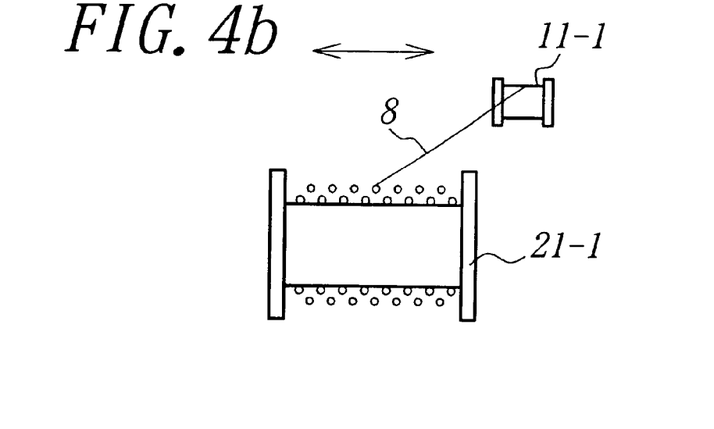

FIGS. 4a and 4b are schematic views respectively explaining a movement of a traversing mechanism. In the present invention, the first traversing mechanism 11-1 and the second traversing mechanism 11-2 are provided to the first bobbin 21-1 and the second bobbin 21-2 respectively. At first, as shown in FIG. 4a, if the fine wire 8 is to be rewound around the first bobbin 21-1 under the condition such that no first traversing mechanism 11-1 is provided, the fine wire 8 is plunged in a pile up portion of the fine wires 8 so that the fine wires 8 are intertwisted and rubbed with each other, and, in an extreme case, the fine wire 8 is broken. The first traversing mechanism 11-1 is used for solving this problem. That is to say, when the fine wire 8 is rewound around the first bobbin 21-1, the first traversing mechanism 11-1 is moved rightward and leftward with respect to the first bobbin 21-1 as shown in FIG. 4b. In this case, a rewinding position of the fine wire 8 in the first bobbin 21-1 can be varied continuously, and thus it is possible to prevent a plunging and intertwisting of the fine wire 8 by aligning the fine wire 8 in the first bobbin 21-1. This is just the same as a spinning mechanism of a reel in fishing. A movement of the second traversing mechanism 11-2 is the same as that of the first traversing mechanism 11-1 mentioned above.

Then, cutting methods of the ceramic green body 2 using the fine wire 8 will be explained with reference to FIGS. 5–8. In the cutting apparatus 1 according to the invention, a basis of cutting the ceramic green body 2 by using the fine wire 8 is that the first arm 6-1 and the second arm 6-2 are moved in the cutting direction of the ceramic green body 2 by driving the first drive portion 7-1 and the second drive portion 7-2 and the fine wire 8 traverses the ceramic green body 2. In the basic cutting mentioned above, the fine wire 8 can be moved in various manners.

Figure 5:
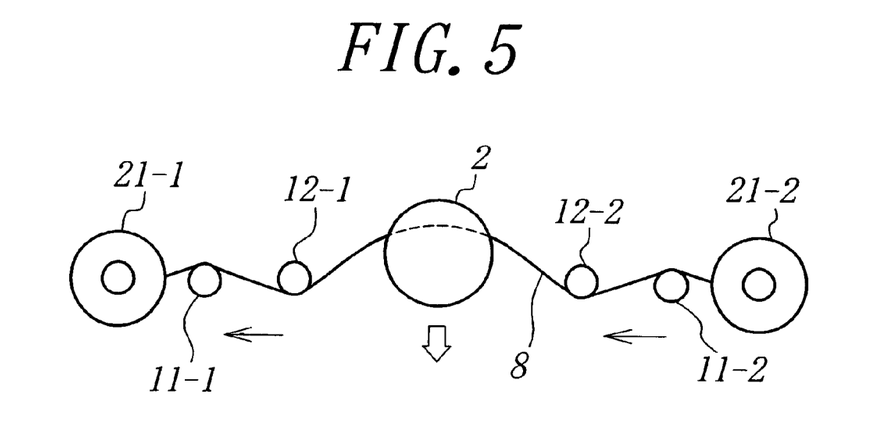
FIG. 5 is a schematic view explaining one embodiment of a cutting operation in the cutting apparatus according to the invention.

FIG. 5 is a schematic view explaining one embodiment of the cutting method in the cutting apparatus 1 according to the invention. In the embodiment shown in FIG. 5, the cutting operation is performed by moving the fine wire 8 from one side to the other side. That is to say, as shown in FIG. 5, during a downward movement of the fine wire 8 across the ceramic green body 2, the fine wire 8 is moved at a constant speed from the second bobbin 21-2 to the first bobbin 21-1.

Figure 6A:
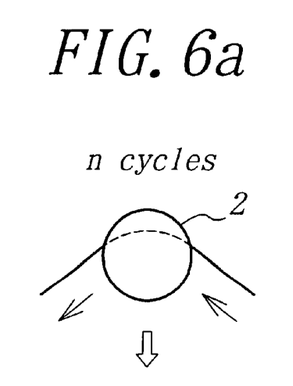
FIGS. 6a and 6b are schematic views respectively explaining another embodiment of the cutting method in the cutting apparatus according to the invention.
Figure 6B:
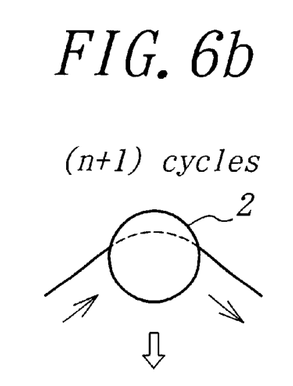

FIGS. 6a and 6b are schematic views respectively explaining another embodiment of the cutting method in the cutting apparatus 1 according to the invention. In the embodiment shown in FIGS. 6a and 6b, a moving direction of the fine wire 8 from one side to the other side is reversed every cutting operations. That is to say, as shown in FIG. 6a, at an n cycle cutting operation, the fine wire 8 is moved at a constant speed from the second bobbin 21-2 to the first bobbin 21-1 during a downward movement of the fine wire 8 across the ceramic green body 2. Then, as shown in FIG. 6b, at an n+1 cycle cutting operation, the fine wire 8 is moved at a constant speed by the same distance as that of the n cycle cutting operation from the first bobbin 21-1 to the second bobbin 21-2 during a downward movement of the fine wire 8 across the ceramic green body 2. In the cutting method shown in FIGS. 6a and 6b, since the cutting operation is performed always by using the same part of the fine wire 8, the part of the fine wire 8 used for the cutting operation is exchanged by moving it to a new part which is not used in a previous cutting operation when the number of the cutting operations reaches to the predetermined maximum number, and the cutting operation is restarted by using the new part of the fine wire 8.

Figure 7:
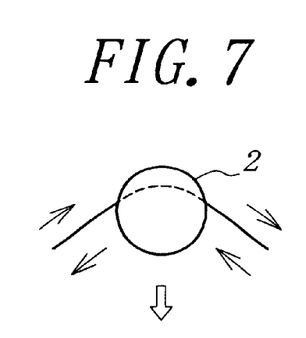
FIG. 7 is a schematic view explaining still another embodiment of the cutting method in the cutting apparatus according to the invention.

FIG. 7 is a schematic view explaining still another embodiment of the cutting method of the cutting apparatus 1 according to the invention. In the embodiment shown in FIG. 7, the cutting operation is performed by moving the fine wire reciprocally in both directions. That is to say, as shown in FIG. 7, during a downward movement of the fine wire 8 across the ceramic green body 2, a movement of the fine wire 8 from the second bobbin 21-2 to the first bobbin 21-1 and a movement of the fine wire 8 from the first bobbin 21-1 to the second bobbin 21-2 are reciprocated in one cutting operation. Also in the cutting method shown in FIG. 7, as is the same as the cutting method shown in FIG. 6, a part of the fine wire 8 used for the cutting operation is exchanged to a new part thereof reaches to the predetermined maximum number, and the cutting operation is restarted by using the new part of the fine wire 8.

The cutting methods shown in FIGS. 5–7 can be suitably selected corresponding to hardness, shape and so on of the ceramic green body 2 to be cut. In each cases, when the fine wire 8 is completely rewound from one bobbin to the other bobbin, the fine wire winding body in which the new fine wire 8 is rewound around the first bobbin 21-1 and the second bobbin 21-2 is exchanged to new one. Moreover, in each cases, if a travelling speed of the fine wire 8 in one direction is varied from that in the other direction when the ceramic green body 2 is cut by using the fine wire 8, a part of the fine wire 8 used for the cutting operation is not always same, and is used for a few cutting operations at best. In this case, the fine wire 8 is not broken during the cutting operation, and thus a long life of the fine wire 8 can be achieved. The cutting methods shown in FIGS. 5–7 can be performed in such a manner that the first servo motor 22-1 and the second servo motor 22-2 are provided to the first fine wire supporting portion 10-1 and the second wire supporting portion 10-2 respectively, and that the first servo motor 22-1 and the second servo motor 22-2 are driven respectively.

Figure 8:
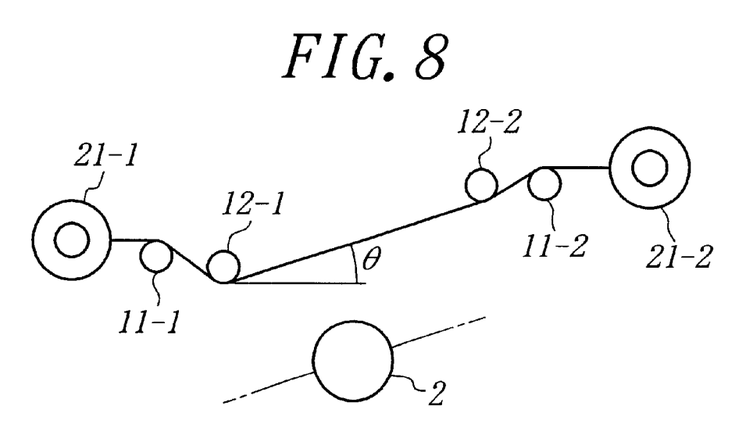
FIG. 8 is a schematic view explaining still another embodiment of the cutting method in the cutting apparatus according to the invention.

FIG. 8 is a schematic view showing still another embodiment of the cutting method in the cutting apparatus according to the invention. In the embodiment shown in FIG. 8, the fine wire 8 is inclined at an angle θ with respect to a horizontal direction and the cutting operation is performed in such a manner that the fine wire 8 has a cutting angle θ with respect to the ceramic green body 2 to be cut. This cutting operation mentioned above is preferred since crashes and defects due to vacuum processes of the ceramic green body 2 can be reduced. The cutting method shown in FIG. 8 can be performed in such a manner that the first drive portion 7-1 and the second drive portion 7-2 are provided to the first arm 6-1 and the second arm 6-2 respectively, and that the first drive portion 7-1 and the second drive portion 7-2 are driven respectively.

The cutting operation of the ceramic green body 2 in the cutting apparatus 1 having the construction mentioned above is as follows. At first, the fine wire 8 stands by at an upper home position as shown in FIGS. 1-2. Under such a condition, the ceramic green body 2 is moved in a travelling direction by means of the travelling path 4. Then, when the gap g between the supporting beds 5 is detected by means of the photoelectric switches 16-1 and 16-2, the first drive portion 7-1 and the second drive portion 7-2 are driven. By driving the first drive portion 7-1 and the second drive portion 7-2, a downward movement of the fine wire 8 is started. Then, the cutting operation is performed by traversing the fine wire 8 across the ceramic green body 2. In this case, a position of the fine wire 8 in the travelling direction is controlled by driving the third drive portion 7-3 in such a manner that the fine wire 8 is moved at the same speed as that of the travelling of the travelling path 4 which is detected by the rotary encoder 15. In this manner, since the fine wire 8 can be always traversed vertically with respect to the ceramic green body 2 during the cutting operation, it is possible to cut the ceramic green body 2 in a vertical direction. It is a matter of course that various movements of the fine wire 8 mentioned above are performed during the cutting operation.

As is clearly understood from the above explanations, according to the invention, since the fine wire for cutting the ceramic green body, which is extended between the first arm and the second arm, is moved from one side to the other side with a constant tension by means of the first fine wire supporting portion and the second fine wire supporting portion, a portion of the fine wire used for cutting is not always same so that such a portion of the fine wire is used only for a few cutting operations, and the fine wire is not broken during the cutting operation. In this manner, it is possible to achieve a long life of the fine wire.

What is claimed is:

1. An apparatus for cutting green ceramic bodies, comprising:

a traveling path for green ceramic bodies;

supporting beds for supporting green ceramic bodies located at constant intervals in series along the traveling path;

first and second arms, one on each side of the traveling path, the arms movable adjacent the path for allowing green ceramic bodies to pass between the arms;

first and second drive portions for moving respective first and second arms perpendicularly relative to the traveling path;

a third drive portion for moving both arms in the same direction as the traveling path;

first and second wire supporting portions on respective arms, each wire supporting portion having a servo motor with an axis of rotation and a magnet member around the axis of rotation;

a plurality of interchangeable and previously prepared fine wire winding bodies having a first rotatable bobbin, a second rotatable bobbin, and a fine wire having first and second ends, wherein each end of the fine wire is wrapped around respective conical surfaces of the bobbins, said winding bodies mountable to, and dismountable from, the apparatus as a unit structure wherein each bobbin is magnetically coupled for rotation about a respective axis of rotation by a respective magnet member and said first and second ends of the wire extending between the arms for cutting the green ceramic bodies; and a traversing mechanism for varying the position where the wire is wound around the axial length of the conical surface.

2. The apparatus for cutting green ceramic bodies of claim 1, wherein substantially all of the wire is wrapped around one bobbin of the winding body for mounting the winding body onto the apparatus.

* * * * *